(12) United States Patent
Morita

(10) Patent No.: US 9,600,248 B2
(45) Date of Patent: Mar. 21, 2017

(54) INFORMATION PROCESSING DEVICE, INFORMATION PROCESSING METHOD, AND COMPUTER PROGRAM

(71) Applicant: Sony Corporation, Tokyo (JP)

(72) Inventor: Tadashi Morita, Tokyo (JP)

(73) Assignee: Sony Corporation, Tokyo (JP)

(*) Notice: Subject to any disclaimer, the term of this patent is extended or adjusted under 35 U.S.C. 154(b) by 76 days.

(21) Appl. No.: 14/382,582

(22) PCT Filed: Mar. 14, 2013

(86) PCT No.: PCT/JP2013/057132
§ 371 (c)(1),
(2) Date: Sep. 3, 2014

(87) PCT Pub. No.: WO2013/150872
PCT Pub. Date: Oct. 10, 2013

(65) Prior Publication Data
US 2015/0058943 A1    Feb. 26, 2015

(30) Foreign Application Priority Data

Apr. 6, 2012   (JP) .................................. 2012-087219

(51) Int. Cl.
*G06F 9/44* (2006.01)
*G06F 9/45* (2006.01)
(Continued)

(52) U.S. Cl.
CPC ............ *G06F 8/40* (2013.01); *G06F 9/45508* (2013.01); *G06F 21/12* (2013.01); *G06F 21/44* (2013.01); *G06F 21/71* (2013.01); *H04L 63/08* (2013.01)

(58) Field of Classification Search
CPC .......... G06F 11/0748; G06F 8/48; G06F 8/49; G06F 13/122
(Continued)

(56) References Cited

U.S. PATENT DOCUMENTS 7,353,248 B1 *   4/2008   Kirkpatrick ......... H04L 67/2819
                                                            707/999.1
2001/0049753 A1   12/2001   Gary
(Continued)

FOREIGN PATENT DOCUMENTS

CN        101036123 A     9/2007
CN        104054085 A     9/2014
(Continued)

OTHER PUBLICATIONS

Oct. 28, 2015, EP communication issued for related EP application No. 13771781.5.
(Continued)

*Primary Examiner* — Duy Khuong Nguyen
(74) *Attorney, Agent, or Firm* — Paratus Law Group, PLLC

(57) ABSTRACT

Provided is an information processing device including a program execution unit that loads, interprets, and executes a computer program code created by a first procedural language. The program execution unit opens a communication channel in response to a communication connection request from an external unit, and returns to each communication channel a result for a processing request sent from an external unit on the opened communication channel.

11 Claims, 10 Drawing Sheets

(51) Int. Cl.
  *G06F 21/12*   (2013.01)
  *G06F 21/44*   (2013.01)
  *H04L 29/06*   (2006.01)
  *G06F 9/455*   (2006.01)
  *G06F 21/71*   (2013.01)

(58) Field of Classification Search
  USPC .......................................................... 717/139
  See application file for complete search history.

(56) References Cited

U.S. PATENT DOCUMENTS

| | | | |
|---|---|---|---|
| 2004/0045007 A1* | 3/2004 | Boland | G06F 9/465 719/315 |
| 2006/0136880 A1 | 6/2006 | Sone et al. | |
| 2008/0295078 A1* | 11/2008 | Stall | G06F 11/3664 717/125 |
| 2009/0070744 A1* | 3/2009 | Taylor | G06Q 10/10 717/128 |
| 2010/0330971 A1* | 12/2010 | Selitser | H04L 67/34 455/418 |
| 2011/0022809 A1* | 1/2011 | Satoh | G06F 9/45533 711/155 |
| 2011/0179347 A1* | 7/2011 | Proctor | G06F 8/51 715/234 |
| 2015/0242617 A1 | 8/2015 | Morita | |

FOREIGN PATENT DOCUMENTS

| | | |
|---|---|---|
| EP | 2808821 A1 | 12/2014 |
| JP | 10-063511 | 3/1998 |
| JP | 2004-133630 | 4/2004 |
| JP | 2012-168645 | 9/2012 |
| WO | WO2013/111490 A1 | 8/2013 |

OTHER PUBLICATIONS

A Simple Example: HelloWorld, Oct. 14, 2015, The Java Web Services Tutorial, Sun Microsystems, pp. 1-8.
Feb. 23, 2016, Japanese Office Action for related JP Application No. 2014-509094.
Mitsuishi, et al., "Design and Implementation of a Programming Language DeLis for Decentralized Application on Networks", Paper Journal of Information Processing Society of Japan, Feb. 1998, vol. 39—No. 2, pp. 403-413.
Stein, "Perl Network Programming", Kabushiki Kaisha Pearson Education, Dec. 20, 2002, pp. 305-316.
Mar. 3, 2016, European Extended Search Report for related EP Application No. 13771781.5.
Nov. 14, 2016, CN communication issued for related CN application No. 201380018131.6.

* cited by examiner

- NAME (pname) —401
- VARIABLE DEFINITION (value) —402
- FUNCTION DEFINITION (function) —403
- SECURITY ATTRIBUTE —404

400

410

| 411 | 412 |
|---|---|
| car0 | cdr0 |
| car1 | cdr1 |
| car2 | cdr2 |
| car3 | cdr3 |
| car4 | cdr4 |
| car5 | cdr5 |
| car6 | cdr6 |
| car7 | cdr7 |
| car8 | cdr8 |
| car9 | cdr9 |

INFORMATION PROCESSING DEVICE, INFORMATION PROCESSING METHOD, AND COMPUTER PROGRAM

CROSS REFERENCE TO PRIOR APPLICATION

This application is a National Stage Patent Application of PCT International Patent Application No. PCT/JP2013/057132 (filed on Mar. 14, 2013) under 35 U.S.C. §371, which claims priority to Japanese Patent Application No. 2012-087219 (filed on Apr. 6, 2012), which are all hereby incorporated by reference in their entirety.

TECHNICAL FIELD

The present disclosure relates to an information processing device, an information processing method, and a computer program.

BACKGROUND ART

In procedural programming languages such as LISP, Ruby, and Python, variables and function definition information is loaded at program runtime, and the program is executed on the basis of the loaded function definitions and variable values. Software that interprets and executes such a procedural programming language (a sequential execution data processing module) loads an application program stated in a procedural programming language every time the software is activated, and thereafter processes input data and outputs a processing result according to the loaded application program.

A characteristic of software that interprets and executes a procedural programming language is that if a defined variable name is input, the content of that variable may be read out. Likewise, if a function that reads out a defined function is input, that function code may be output.

In the past, computer system architecture involved breaking down the requested specifications into function modules for individual tasks, defining the module control instructions and communication means from the start, and using a compiler to realize the construction. In function module development, the behavior of a module is defined from the start using programming code in the function module or by using a predefined code, which undergoes a sequence of compiling, linking, and debugging before being incorporated into the system.

CITATION LIST

Patent Literature

Patent Literature 1: JP 2011-513824T
Patent Literature 2: WO 2005/121976

SUMMARY OF INVENTION

Technical Problem

A sequential execution data processing module of the related art is configured to operate via a keyboard communication channel and a file system read/write channel, loading and executing a script program while switching the channel according to instructions from commands, and if necessary, opening a new communication channel and using a script program from that communication channel.

The present disclosure provides a new and improved information processing device, information processing method, and computer program realizing a sequential execution data processing module that opens a communication channel with an external unit, executes a processing request from the external unit, and returns a result for each communication channel.

Solution to Problem

According to an embodiment of the present disclosure, there is provided an information processing device including a program execution unit that loads, interprets, and executes a computer program code created by a first procedural language. The program execution unit opens a communication channel in response to a communication connection request from an external unit, and returns to each communication channel a result for a processing request sent from an external unit on the opened communication channel.

According to another embodiment of the present disclosure, there is provided an information processing method including loading, interpreting, and executing a computer program code created by a first procedural language. The executing opens a communication channel in response to a communication connection request from an external unit, and returns to each communication channel a result for a processing request sent from an external unit on the opened communication channel.

According to another embodiment of the present disclosure, there is provided a computer program that causes a computer to load, interpret, and execute a computer program code created by a first procedural language. The executing opens a communication channel in response to a communication connection request from an external unit, and returns to each communication channel a result for a processing request sent from an external unit on the opened communication channel.

Advantageous Effects of Invention

According to the present disclosure as described above, it is possible to provide a new and improved information processing device, information processing method, and computer program realizing a sequential execution data processing module that opens a communication channel with an external unit, executes a processing request from the external unit, and returns a result for each communication channel.

DESCRIPTION OF EMBODIMENTS

Figure 1:
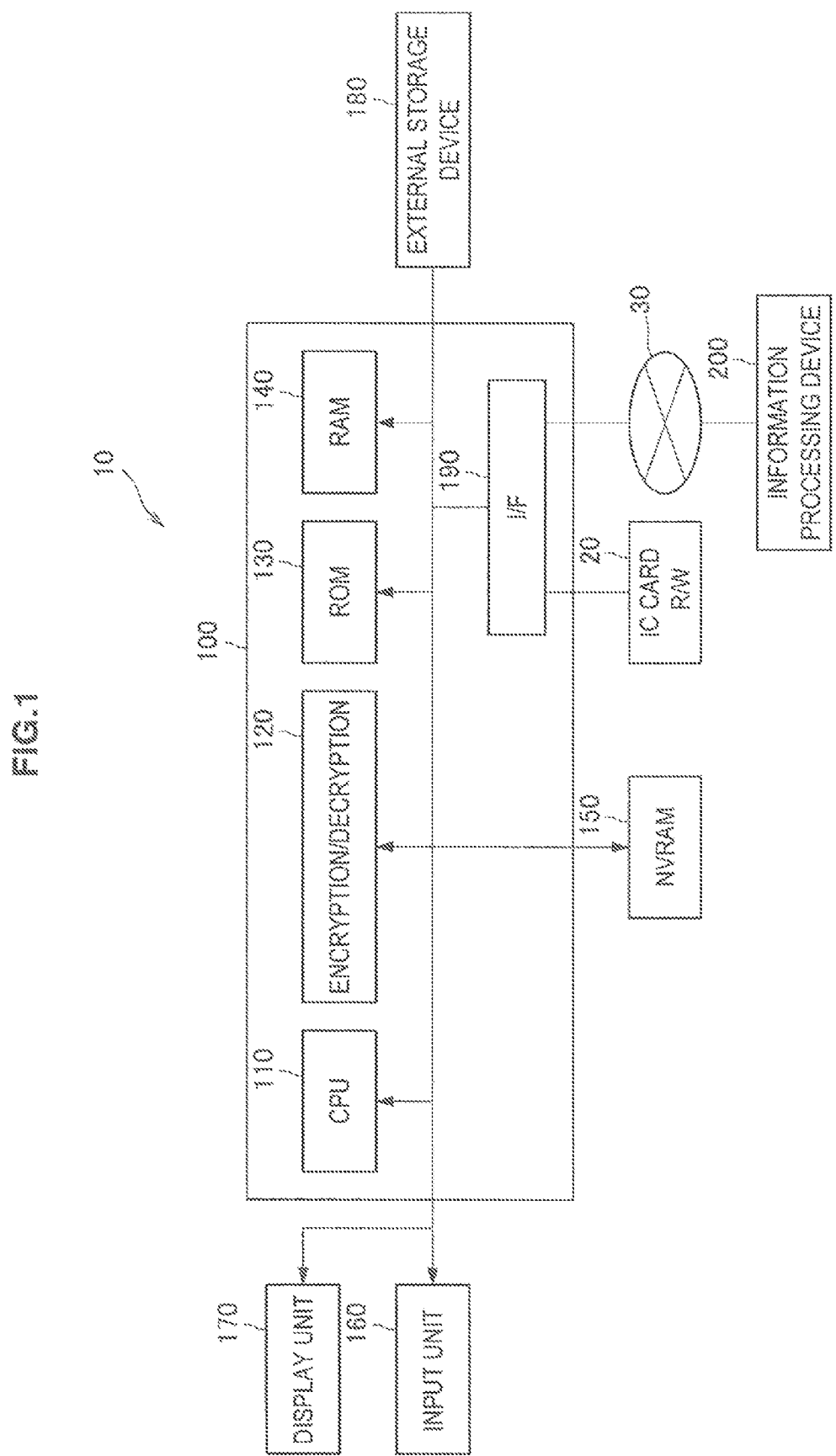
FIG. 1 is an explanatory diagram illustrating a functional configuration of an information processing system 10 according to an embodiment of the present disclosure.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will proceed in the following order.

<1. Related art and problems thereof>
<2. Embodiment of present disclosure>
[Functional configuration of information processing system]
[Program structure examples]
[Use case examples]
<3. Conclusion>

1. Related Art and Problems Thereof

First, before describing a preferred embodiment of the present disclosure in detail, the related art of the present disclosure and the problems thereof will be described. As discussed earlier, in previous computer system architecture, the requested specifications are broken down into function modules for individual tasks, the module control instructions and communication means are defined from the start, and by compiling using a compiler, the architecture of the system is realized. In function module development, the behavior of a function module is defined from the start using programming code in the function module, or alternatively, by using a predefined code, which undergoes a sequence of compiling, linking, and debugging before being incorporated into the system.

For a function module generated at this point, the properties, communication means, and instruction format are individually decided, thus requiring similar test to be conducted over and over, and debugging and correction of the system is time-consuming.

In addition, even in the case of development according to a scheme that divides into multiple execution modules and communicates via a network, changing the behavior of each function module must start from reprogramming. Furthermore, when implementing a security function discussed later in an execution module, it is necessary to carefully implement that security function. Thus, there is a problem in that development costs are hardly lowered.

Also, when incorporating a security function, in some cases security is maintained by keeping that code a secret, but there is a problem in that, in the case in which code correction is necessary, many developers involved with changes to that execution module will learn information about the security function.

In recent years, mechanisms that improve these problems using a scripting language are being created. However, loading a script is realized by using a keyboard to load a file recorded on a hard disk or the like provided in the system, and a script processing module with functions for safely loading a script over a network and safely linking multiple data processing modules did not exist.

There does exist a system that executes code realized by a script processing module that executes a script, and coordinates operation while conducting network communication, but an advanced, remotely controllable script processing module, such as one that connects to a network and builds a script program for another script processing module at the other end of a connection via the connected network, did not exist, and safely making changes to a program remotely was not possible.

Using a compiled language to build an architecture enabling the behavior of one execution module to be freely changed by simply changing an initialization file tended to produce defects, such as increased redundancy and waste, and a lack of required components. Additionally, when developing a secure application, in the case of desiring to maintain compatibility while also concealing a mutual authentication or other security algorithm, it was necessary to disclose that security algorithm as many times as there are applications, making it difficult to keep security high.

Accordingly, the preferred embodiment of the present disclosure described hereinafter illustrates a sequential execution data processing module able to expand the functionality of a sequential execution data processing module, and execute a transaction with distributed responsibility by distributing the transaction across multiple modules while also executing an authentication process among those modules. Additionally, the preferred embodiment of the present disclosure described hereinafter illustrates a sequential execution data processing module equipped with multiple command input communication channels. This sequential execution data processing module is configured to be able to maintain a communication connection for each communication channel, and while successively processing requests from each channel, also use the resulting internal state changes on another channel.

2. Embodiment of Present Disclosure

Functional Configuration of Information Processing System

First, a functional configuration of an information processing system according to an embodiment of the present disclosure will be described. FIG. 1 is an explanatory diagram illustrating a functional configuration of an information processing system 10 according to an embodiment of the present disclosure. Hereinafter, FIG. 1 will be used to describe a functional configuration of the information processing system 10 according to an embodiment of the present disclosure.

As illustrated in FIG. 1, the information processing system 10 according to an embodiment of the present disclosure includes an information processing device 100 that executes a program, non-volatile random access memory (NVRAM) 150, an input unit 160, a display unit 170, an external storage device 180, and an interface (I/F) 190.

The information processing device 100 is configured to be able to interpret and execute a procedural programming language. Such a programming language may be LISP, Scheme, Ruby, or Python, for example.

As illustrated in FIG. 1, the information processing device 100 includes a central processing unit (CPU) 110, an encryption/decryption unit 120, ROM 130, and RAM 140.

The CPU 110 controls the operation of the information processing device 100, and by executing a readout instruction for operating system software prerecorded in the ROM 130, is able to execute that operating system. When executing the operating system, the CPU 110 may use the RAM 140 as a work area. Herein, the operating system recorded in the ROM 130 is able to interpret and execute a procedural programming language as discussed earlier, for example. Note that in the present disclosure, a procedural program may also be loaded and executed from the external storage device 180.

A program loaded from the ROM 130 of the information processing device 100 according to the present embodiment a basic function of the above procedural programming language processed via an interpreter, in addition to a security function. As a result, when installing an application program on the information processing device 100, compiling in advance is not necessary, and moreover is security function is added, making it possible to debug the application with the information processing device 100 itself. Consequently, this leads to a shortening of the development step, enabling the development of an application program over a short period.

The encryption/decryption unit 120 performs an encryption process using a specified key on input data and outputs, and performs a decryption process using a specified key on input encrypted data and outputs. In the present embodiment, source code is encrypted when saving source code to the external storage device 180, and decrypts source code that is stored in the external storage device 180 in an encrypted state. Keys used by the encryption/decryption unit 120 to encrypt and decrypt source code are stored in the NVRAM 150.

The input unit 160 is connected to the information processing device 100, and receives a user's input operation with respect to the information processing device 100. The input unit 160 made be made up of a keyboard, mouse, touch panel, or the like, for example. The display unit 170 is connected to the information processing device 100, and displays an information processing result from the CPU 110 of the information processing device 100 on the basis of a process of the CPU 110. The display unit 170 may be made up of a liquid crystal display, an organic EL display, or other flat panel display device, for example.

The external storage device 180 is connected to the information processing device 100, and stores various data used by the information processing device 100. The display unit 170 may be made up of a hard disk, for example.

In the present embodiment, the external storage device 180 stores a sequential execution data processing module able to interpret and execute a procedural programming language (hereinafter also designated the "list processing module"), and source code that is loaded and executed by the sequential execution data processing module. This source code is stored in a state of being encrypted by the encryption/decryption unit 120. Storing source code in a state of being encrypted by the encryption/decryption unit 120 enables higher confidentiality of the source code.

The interface 190 is an interface for connecting the information processing device 100 to other devices and equipment, and is made up of a serial interface, an parallel interface, and the like, for example. FIG. 1 illustrates a state of the information processing device 100 being connected via the interface 190 to an IC card reader/writer 20 and an information processing device 200 connected to a network 30.

In the present embodiment, the information processing device 200 also includes a configuration similar to the configuration of the information processing device 100 illustrated in FIG. 1, and a list processing module is able to load source code and execute a script.

Note that in FIG. 1, the NVRAM 150, the input unit 160, and the display unit 170 as illustrated as being provided externally to the information processing device 100, but the present disclosure is not limited to such an example. In other words, at least one of the NVRAM 150, the input unit 160, and the display unit 170 may also include a configuration provided internally to the information processing device 100. The foregoing thus uses FIG. 1 to describe a hardware configuration of the information processing device 100 according to an embodiment of the present invention. Next, a structure of a computer program executed by the information processing device 100 illustrated in FIG. 1 will be described.

[Program Structure Examples]

FIGS. 2 to 5 are explanatory diagrams illustrating an exemplary structure of a computer program executed by an information processing device 100 according to an embodiment of the present invention. Hereinafter. FIGS. 2 to 5 will be used to describe an exemplary structure of a computer program executed by an information processing device 100 according to an embodiment of the present invention.

Note that in the following description, unless specifically stated otherwise, LISP is presupposed to be the language of the computer program executed by the information processing device 100. However, in the present disclosure, the language usable as the programming language is not limited to such an example, and any procedural programming language may be used insofar as the language may be configured such that, in an extended function or a standard function, security may be configured independently per variable and per function.

Figures 2, 3:
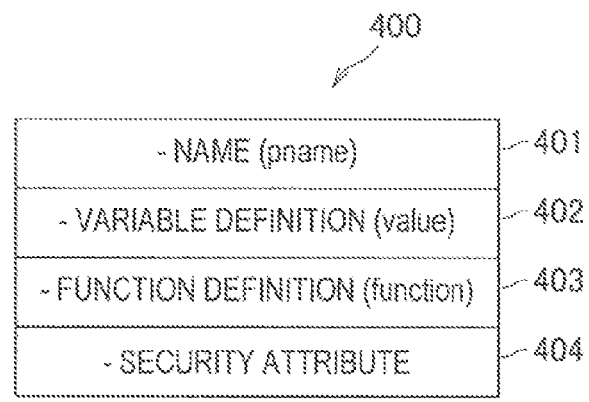
FIG. 2 is an explanatory diagram illustrating an exemplary structure of a computer program executed by an information processing device 100 according to an embodiment of the present invention.
FIG. 3 is an explanatory diagram illustrating an exemplary structure of a computer program executed by an information processing device 100 according to an embodiment of the present invention.

The CPU 120, when executing a computer program, loads a list processing module for interpreting and executing the source code of a program developed by the information processing device 100 and installed on the information processing device 100. FIG. 2 is an explanatory diagram illustrating a data structure called a symbol that may be defined by the list processing module.

As illustrated in FIG. 2, a symbol 400 that may be defined by the list processing module is made up of a name area 401, a variable definition area 402, a function definition area 403, and a security attribute area 404.

The name area 401 points to a printable character table. The name area 401 stores the variable name if that symbol defines a variable, and stores the function name if a function is defined. In FIG. 2, the name area 401 is indicated by "pname".

If the symbol defines a simple variable, the variable definition area 402 stores the value thereof, whereas if a list variable is defined, a value pointing to the list is stored. In FIG. 2, the variable definition area 402 is indicated by "value".

If the symbol defines a function, the function definition area 403 stores the function itself. In FIG. 3, the function definition area 403 is indicated by "function".

The security attribute area 404 stores information related to a security attribute for that symbol. The security attribute may be a read variable attribute, a change variable attribute, or an execute function attribute, for example. The security attribute area 404 stores an access flag that indicates access rights to that symbol, and a value that points to a table storing an authentication key for accessing that symbol.

In addition to the symbol 400 illustrated in FIG. 2, cells called cons cells for constructing a list structure are consecutively defined. FIG. 3 is an explanatory diagram illustrating an exemplary configuration of a cons cell 410 for constructing a list structure. As illustrated in FIG. 3, the cons cell 410 is an object made up of two pointers called a car slot 411 and a cdr slot 412. FIG. 3 illustrates car0 to car9 as the car slot 411, and cdr0 to cdr9 as the cdr slot 412. Obviously, the numbers of respective slots are not limited to such an example.

Figure 4:
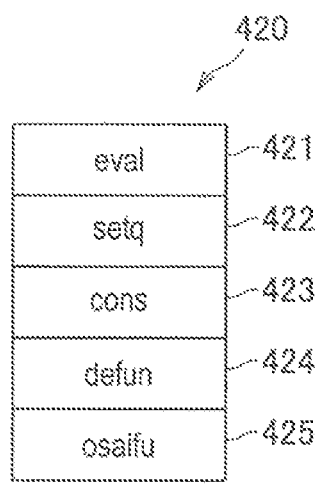
FIG. 4 is an explanatory diagram illustrating an exemplary structure of a computer program executed by an information processing device 100 according to an embodiment of the present invention.

A table for storing a name stored in the name area 401 of the symbol 400 is also provided. FIG. 4 is an explanatory diagram illustrating an exemplary structure of a name storage table 420 for storing a name stored in the name area 401 of the symbol 400. In the name storage table 420 illustrated in FIG. 4, the names "eval", "setq", "cons". "defun", and "osaifu" are stored, and exist in a 1-to-1 correspondence with their actual symbols. The sign 421 is an area storing the name "eval", the sign 422 is an area storing the name "setq", the sign 423 is an area storing the name "cons", the sign 424 is an area storing the name "defun", and the sign 425 is an area storing the name "osaifu". If a symbol name from outside the name storage table 420 is input into the name storage table 420, the symbol corresponding to the input symbol name stored in the name storage table 420 is pointed to and evaluated. Note that "osaifu" is taken to be a variable indicating a electronic money balance in the case in which an electronic money function is installed on the information processing device 100.

Figure 5:
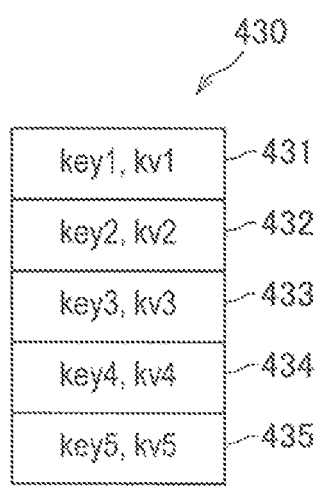
FIG. 5 is an explanatory diagram illustrating an exemplary structure of a computer program executed by an information processing device 100 according to an embodiment of the present invention.

Additionally, there is provided a table corresponding to a value which is stored in the security attribute area 404 of the symbol 400 and which points to a table storing an authentication key. FIG. 5 is an explanatory diagram illustrating an exemplary structure of an authentication key table 430 that stores an authentication key. FIG. 5 illustrates a state in which authentication keys are managed by version numbers (kv1 to kv5) in the authentication key table 430. The sign 431 is an area storing the key "key1", the sign 432 is an area storing the key "key2", the sign 433 is an area storing the key "key3", the sign 434 is an area storing the key "key4", and the sign 435 is an area storing the key "key5".

Figure 6:
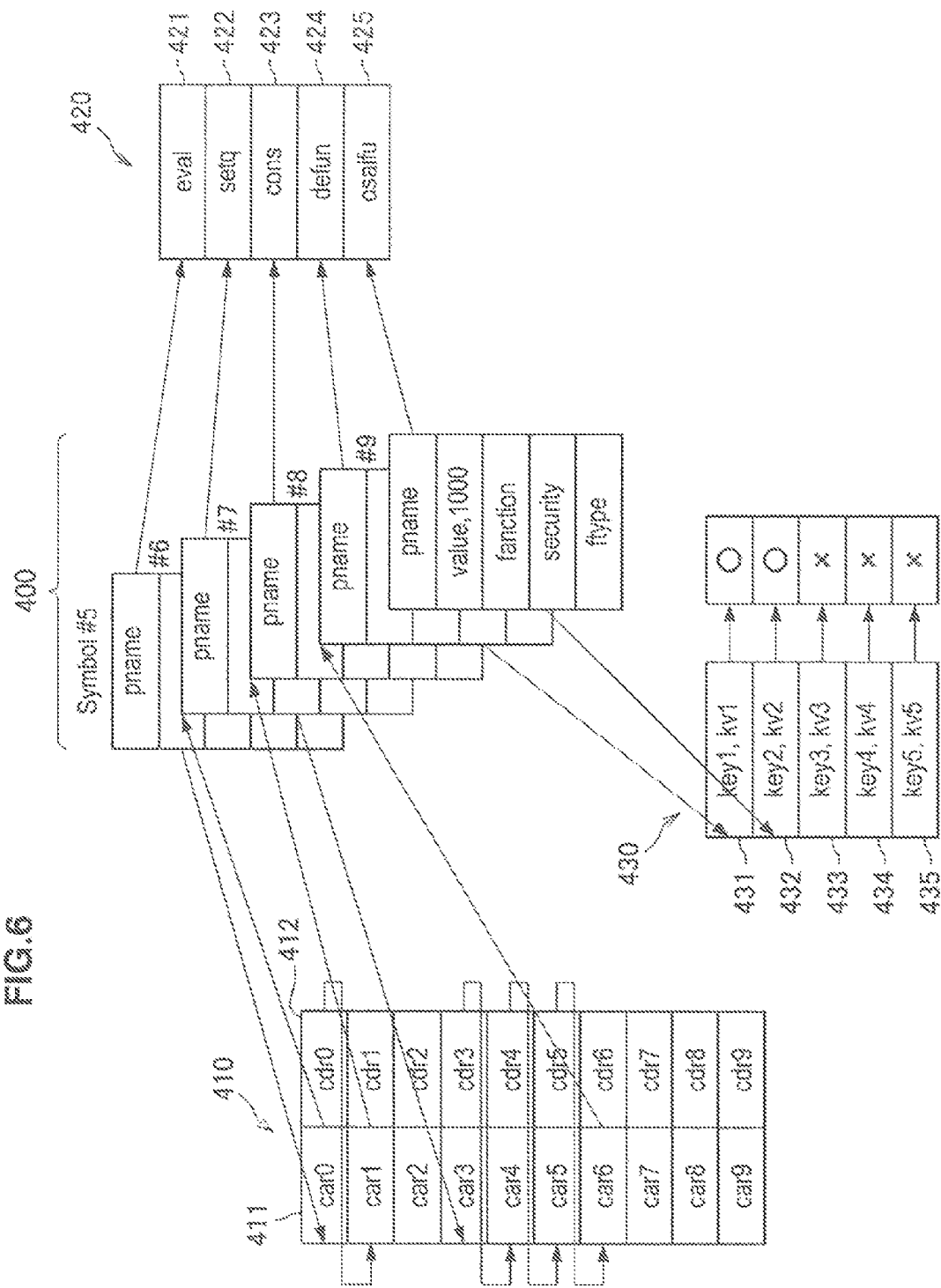
FIG. 6 is an explanatory diagram illustrating correspondence relationships among the symbols illustrated in FIG. 2, the cons cells illustrated in FIG. 3, the name storage table illustrated in FIG. 4, and the authentication key table illustrated in FIG. 5.

FIG. 6 is an explanatory diagram illustrating correspondence relationships among the symbols illustrated in FIG. 2, the cons cells illustrated in FIG. 3, the name storage table illustrated in FIG. 4, and the authentication key table illustrated in FIG. 5. As discussed earlier, a symbol has an area that points to a table of a printable name, an area that points to a value or list of values, a function attribute, and a security attribute. The function attribute has a function type and a pointer that points to the function itself. The security attribute has a security flag, a key version, and pointers that point to keys. Note that FIG. 6 illustrates how the key "key1" indicated by the sign 431 and the key "key2" indicated by the sign 432 in the authentication key table 430 illustrated in FIG. 5 are used.

In this way, the general structure of a list processing module is called a symbol, and is made up of a pointer to a numerical value or a list holding numerical values, a pointer to a function if a function definition, and a pointer that points to a table storing a printable character string.

Furthermore, in the present embodiment, in addition to the above, a security attribute and pointers to a table holding two types of encryption key information are added to a symbol. The pointer to the first key indicates a master key, while the pointer to the other key indicates an access key (authentication key) for that symbol. In the case of changing the security attribute or the access key for the symbol, the master key indicates the key to be authenticated with by mutual authentication in advance. In the case in which the security flag set for that symbol is raised during content evaluation or content modification of the information held in the symbol, or function execution, authentication with the first key added to the symbol becomes a condition for using that symbol. In the case of changing the key for that symbol, the other key indicates a rights authentication key that checks the rights thereof. Modification of the access information must be done while authenticated with that rights authentication key.

In addition, there are two sets of pointers, called cons cells, that express a relationship between symbol and symbol, as illustrated in FIG. 3. Each pointer is structured to point to a cons cell that indicates a symbol or another symbol.

A built-in function is written to the ROM 130, and at the first power-on of the information processing device 100, the built-in function written to the ROM 130 is defined in a symbol created in the RAM 140. At subsequent power-ons, an already registered symbol is not initialized.

The above configuration is structured to function similarly even in the case of a user registering a new function.

The list processing module executed by the CPU 110 is configured to be able to freely register a symbol, and freely register a numerical value, list, or function in that symbol. Additionally, in order to apply a security function to a registered symbol, an encryption key and an access flag is registered in that symbol. In the list processing module executed by the CPU 110, an encryption key called a system key is initially set. A newly registered symbol may be set with a key unique to that symbol and an access flag only while in a mutually authenticated mode using that system key. In addition, a computer program executed by the list processing module executed by the CPU 110 is configured to be able to change the variables or function definitions used as long as the state is still a mutually authenticated mode using the system key.

When registering a function symbol, the list processing module executed by the CPU 110 is subject to a registration condition that all symbols used by that function are authenticated with all keys. Additionally, the list processing module is structured such that in the subsequent case of using that registered function, it is sufficient to be simply authenticated with that function execution key.

The foregoing thus describes a structure of a computer program executed by the information processing device 100 illustrated in FIG. 1. Next, a computer program executed by the information processing device 100 or 200 will be described in detail.

An information processing device 100 or 200 according to the present embodiment has a configuration that expands the functionality of a sequential execution data processing module, and not only loads and executes commands input from a keyboard or scripts recorded in files via a single channel, but also opens multiple network channels, and processes successive requests while maintaining the channels. An information processing device 100 or 200 according to the present embodiment, by having such a configuration, becomes able to dynamically modify functions that process requests from a given channel and internally held variables, according to a processing request from another channel.

Figure 7:
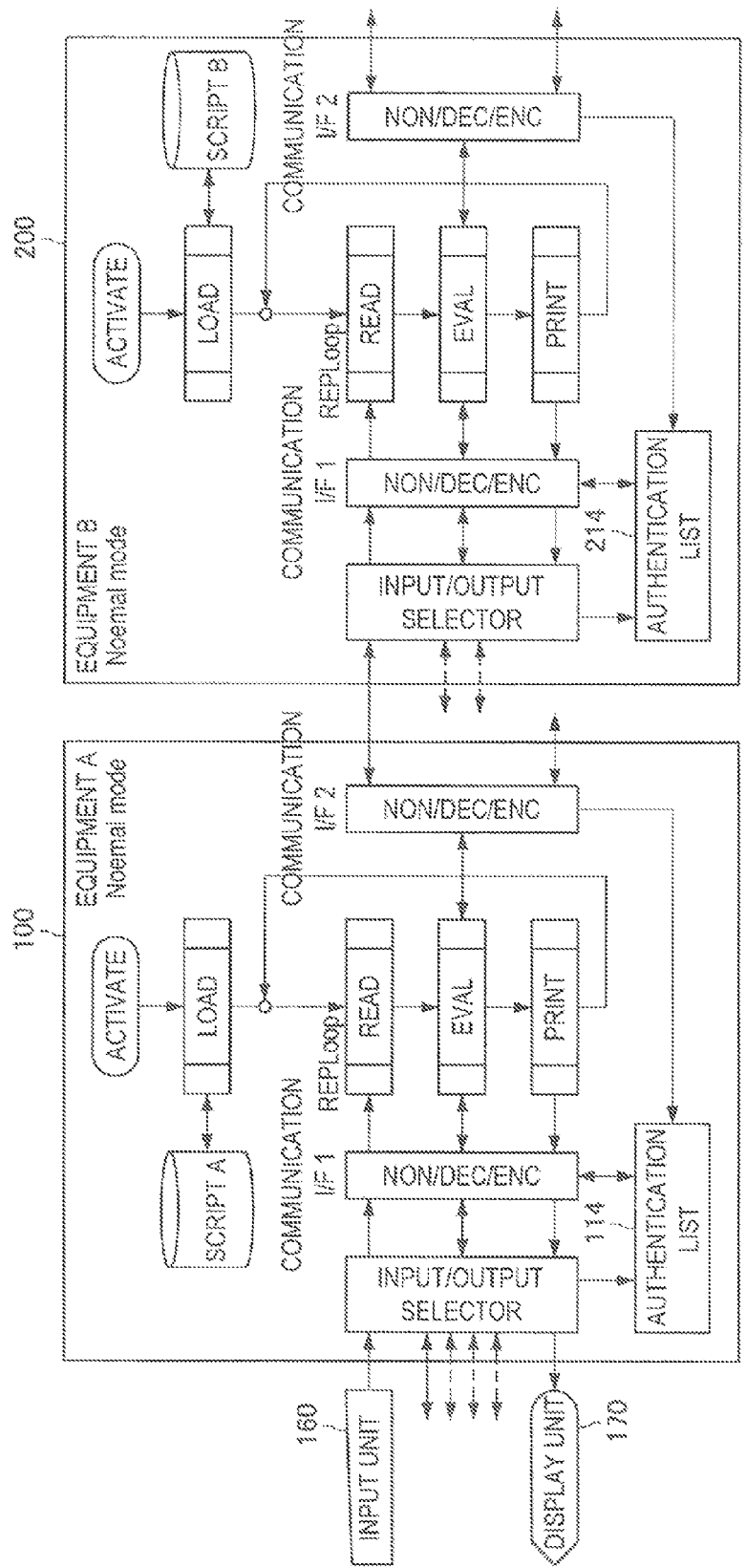
FIG. 7 is an explanatory diagram illustrating an overview of a computer program executed by an information processing device 100 or 200 according to an embodiment of the present disclosure.

FIG. 7 is an explanatory diagram illustrating an overview of a computer program executed by an information processing device 100 or 200 according to an embodiment of the present disclosure. Hereinafter, FIG. 7 will be used to describe an overview of a computer program executed by an information processing device 100 or 200 according to an embodiment of the present disclosure.

A sequential interpretation language has as an interactive mode a read-eval-print loop (REPL) called the top level. If an instruction is input from the display unit 170 connected to the information processing device 100, the instruction is read (read), evaluated (eval), and output (print) by this REPL.

In the present embodiment, a function input by the information processing device 100 outputs a script to the information processing device 200, receives an evaluation (eval) result on the information processing device 200, and outputs (print) as a result on the information processing device 100. In the case in which external equipment connected to the information processing device 200 provides similar sequential interpretation language input, this REPL is repeated.

Additionally, the present embodiment has a configuration that not only loads and executes commands input from a keyboard or scripts recorded in files via a single channel, but also opens multiple network channels, and processes successive requests while maintaining the channels.

Assume that a function or defined variable of a sequential interpretation language is structured having an access control flag as discussed earlier, for example, and that authentication is requested in the case of reading out a variable or function defined by external equipment, or changing the definition of a variable or function, for example. For example, in the case of attempting to execute a variable or function defined by a script B stored in the information processing device 200 with a sequential interpretation function module of the information processing device 100, assume that mutual authentication between the information processing device 100 and the information processing device 200 is requested. The reverse is also similar.

Also, the information processing devices 100 and 200 include authentication lists 114 and 214, respectively. The authentication lists 114 and 214 are provided in order to manage access to functions and variables having a security attribute, and as discussed later, the authentication lists 114 and 214 are held for each communication channel.

Assume that the information processing device 100 and the information processing device 200 have a similar structure, and that the communication I/F 1 switches between a local port and a network communication port, and has an authentication mode. In addition, the information processing devices 100 and 200 are each equipped with an input/output selector. FIG. 7 illustrates the information processing device 100 in a state of being connected to a local port or to another device over a network by the input/output selector, and illustrates the information processing device 200 in a state of being connected to the information processing device 100 or another device on a network communication port by the input/output selector.

For example, the variable "osaifu" discussed earlier is a variable storing an electronic money balance, but in the case in which a script in which this variable is defined is saved on the information processing device 200, for example, if the sequential interpretation function module of the information processing device 100 attempts to reference this variable, the sequential interpretation function module of the information processing device 100 will be unable to reference this variable unless the information processing device 100 and the information processing device 200 are mutually authenticated.

Also, in the case in which a script in which the "osaifu" variable is defined is being stored in the information processing device 100, as discussed later, it is possible to reference the "osaifu" variable from an external device. Even in this case, the information processing device 100 is still able to reference the "osaifu" variable after executing mutual authentication with that external device.

The mode of the communication I/F 1 transitions from a mode 0 to a mode 1 upon success of a function "auth1" discussed later, and likewise transitions from mode 1 to a mode 2 upon success of a function "auth2" discussed later. Also, the communication I/F 2 transitions from a mode 0 to a mode 1 upon success of a function "ex-auth1" discussed later, and likewise transitions from mode 1 to a mode 2 upon success of a function "ex-auth2" discussed later. Herein, the function "auth1" is generated by the function "ex-auth1" by EVAL, and the function "auth2" is generated in the same way by the function "ex-auth2". The functions "auth1" and "auth2" are sent to the network communication port via the communication I/F 2.

The communication I/F 2 of the information processing device 100, after transitioning from mode 1 to mode 2 upon success of the function "ex-auth2", extends an encrypted communication session with the communication I/F 1 of the information processing device 200. After an encrypted communication session is extended between the communication I/F 2 of the information processing device 100 and the communication I/F 1 of the information processing device 200, transmitted messages sent by EVAL are encrypted, and received messages are decrypted. Similarly, if the communication I/F 2 of the information processing device 200 also goes to mode 2 upon success of the function "ex-auth2", an encrypted communication session is established with the communication I/F 2 of the information processing device 100. After an encrypted communication session with the communication I/F 2 of the information processing device 100 is established by the communication I/F 1 of the information processing device 200, by decrypting received messages and encrypting transmitted messages, encrypted communication with the communication I/F 2 of the information processing device 100 becomes possible.

In the present embodiment, the state of the communication I/F 1 being connected to a network as with the information processing device 200 is called minion mode. In minion mode, a script may be sent using a procedure function "request" from equipment in an ordinary mode (designated the normal mode), and equipment in normal mode is able to obtain a result from equipment in minion mode. Also, equipment switched to minion mode is accessible from any equipment via the network, rather than via a keyboard connected to the equipment. Consequently, minion mode restricts the behavior of a procedure function in the sequential interpretation function mode.

The communication I/Fs 1 and 2 communicate with each other in plaintext during authentication modes 0 and 1, but after switching to authentication mode 2, random numbers obtained by exchange by mutual authentication are used for encrypted communication, with one being used as a session key, and another being used as an initial value. Note that the authentication scheme uses a scheme that utilizes the above configuration to authenticate multiple symbols at the same time.

The data structure defines a structure with 16 bytes to a block, for example. Data input is expressed as "#_nnnn . . . " in hexa input, for example, and as "#~nnnn . . . " in the case of base64.

A 3-bit security flag is added to a symbol, for example, and the functionality of the functions eval, mod, and exe is restricted by the security flag. Additionally, the above 16-byte block data is treated as an authentication key, and pointer data to that authentication key is added to the symbol.

Assume that the authentication condition is that for a security-locked variable, function usage, or evaluation, each symbol must be in mode 2 by internal mutual authentication (auth1, auth2), or mode 1 by external authentication (ex-auth1).

Assume that the functionality restriction for a standard command prevents execution unless the global variables and functions used by a function defined by a "define" function are already defined and have already passed required authentication. Also, assume that using a function or variable in a security-locked argument is unavailable unless that variable is already authenticated. In the case of traversing network communication, assume that in order to use the "define" function at the top level, the mode of the communication I/F 1 must be mode 2. Assume that a function or variable set with the security flag is unavailable unless already authenticated at the time of execution or evaluation.

In the present embodiment, function commands related to the execution of a script across devices are defined as follows, for example. Obviously, the names and functionality of the commands are not limited to that indicated below.
undef: Delete a function or variable defined by the "define" function
start-minion: Connect a socket of a specific net address port as the Read input and Print output of a script
conn-minion: Connect a port of a specific net address to a communication socket of other equipment
request: Transmit a script to equipment in minion mode, and receive the result
setsym: Add a security attribute to a symbol
auth1: Authenticate using an authentication key belonging to a symbol, and a message code from a random number
auth2: Exchange data again and mutually authenticate on the basis of data exchanged by "auth1"
ex-auth1: Generate "auth1" function, transmit to equipment in minion mode, receive/analyze the result, and store internally
ex-auth2: Using content received and analyzed by "ex-auth1" command, additionally generate m4 and incorporate into "auth2" command, and transmit to equipment in minion mode
backup: write loaded and defined variables, functions, and security attributes to file as an initialization file Assume that the functionality restriction on functions is such that usage of the above functions "ex-auth1" and "ex-auth2" requires authentication by the system key in minion mode. Note that in the case of normal mode, assume that authentication is not required when using the functions "ex-auth1" and "ex-auth2". By restricting usage of the functions "ex-auth1" and "ex-auth2" in this way, it is possible to prevent unauthorized authentication using a key set externally via the network.

Also, assume that usage of the function "load" requires authentication by the system key in normal mode. Note that in the case of normal mode, assume that authentication is not required when using the function "load". By restricting usage of the function "load" in this way, it is possible to prevent unauthorized modification according to another, external initialization file via the network.

Also, assume that usage of the function "backup" requires authentication by the system key in normal mode. By restricting usage of the function "backup" in this way, it is possible to prevent authorized remote backup.

Assume that the file usage restriction is such that an initialization file loaded with the function "load" remains locked during execution of the list processing module. As a result, it is possible to prevent the same initialization file from being loaded from multiple modules and the content becoming contested due to being modified.

The foregoing thus uses FIG. 7 to describe an overview of a computer program executed by an information processing device 100 or 200 according to an embodiment of the present disclosure. Next, operations of an information processing device 100 and 200 according to an embodiment of the present disclosure will be described.

One method of using a function or variable built into a sequential execution data processing module executed by an information processing device 100 or 200 according to an embodiment of the present disclosure as a processing request from another communication channel is a method that first closes the channel in advance, and then newly reconfigures the communication channel. However, in the case of implementing this method, it is necessary to build a program that closes a channel and then opens a new channel, and the procedure becomes complicated. Hereinafter, operations of a sequential execution data processing module that opens a communication channel and processes successive requests while maintaining the channel will be described.

Figure 8:
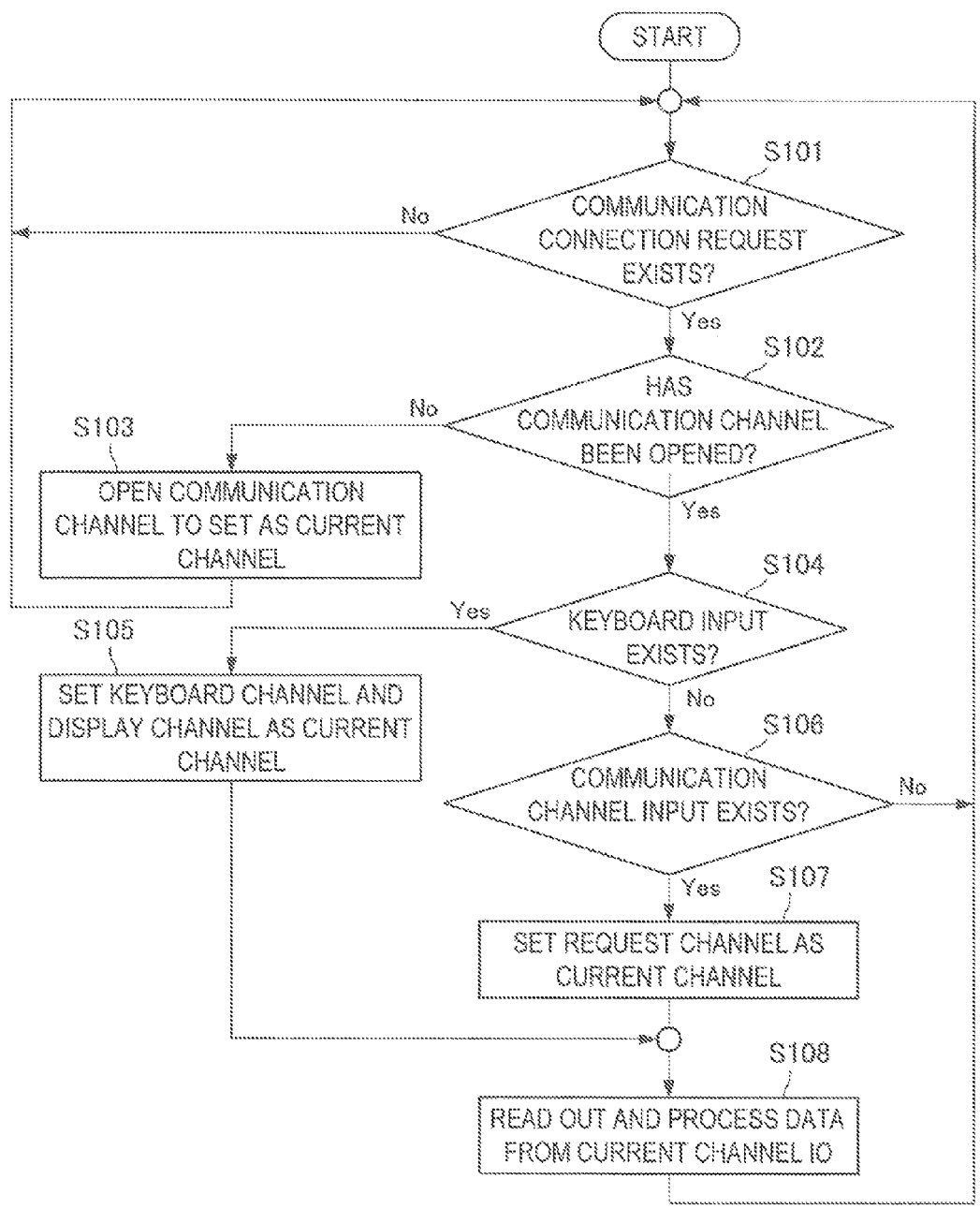
FIG. 8 is a flowchart illustrating operations of an information processing device 100 and 200 according to an embodiment of the present disclosure.

FIG. 8 is a flowchart illustrating operations of an information processing device 100 and 200 according to an embodiment of the present disclosure. The flowchart illustrated in FIG. 8 is an illustration of operations in the case which, during the execution of a sequential execution data processing module, there is a communication connection request from another sequential execution data processing module. Hereinafter, FIG. 8 will be used to describe operations of an information processing device 100 and 200 according to an embodiment of the present disclosure. Note that the following description exemplifies sequential execution data processing module operations in the case in which a sequential execution data processing module executed by the information processing device 100 receives a communication connection request from the information processing device 200.

First, after activating the sequential execution data processing module discussed earlier, the information processing device 100 opens a keyboard input communication request receiving channel, and stands by until an input flag is raised. While executing the sequential execution data processing module periodically checks whether or not there is a communication connection request from another device (the information processing device 200) (step S101). The sequential execution data processing module executed by the information processing device 100 repeats the check in step S101 until there is a communication connection request from another device (the information processing device 200). When there is a communication connection request from another device (information processing device 200), the sequential execution data processing module executed by the information processing device 100 subsequently judges whether or not a communication channel is already open in the sequential execution data processing module (step S102).

If the result of the judgment in the above step S102 is that a communication channel is not already open in the sequential execution data processing module, the sequential execution data processing module executed by the information processing device 100 opens a communication channel with the information processing device 200, and sets that communication channel as the current channel (step S103). The sequential execution data processing module executed by the information processing device 100 prepares an input/output port of a sequence register used per communication channel. The sequential execution data processing module, after opening a communication channel with the information processing device 200, returns once again to the above step S101.

On the other hand, if the result of the judgment in the above step S102 is that a communication channel is already open in the sequential execution data processing module, the sequential execution data processing module executed by the information processing device 100 subsequently judges whether or not there is input from a keyboard constituting the input unit 160 (step S104).

If the result of the judgment in step S104 is that there is input from the keyboard constituting the input unit 160, the sequential execution data processing module executed by the information processing device 100 sets the keyboard channel and the display channel as the current channels (step S105).

On the other hand, if the result of the judgment in step S104 is that there is no input from the keyboard constituting the input unit 160, the sequential execution data processing module executed by the information processing device 100 subsequently judges, for all opened communication channels, whether or not there is input (step S106).

If there is no input from an opened communication channel, the sequential execution data processing module returns once again to the process in the above step S101, and enters a standby state. On the other hand, if there is input from an opened communication channel, the sequential execution data processing module executed by the information processing device 100 sets the communication channel opened for the information processing device 200 with the communication connection request (the request channel) as the current channel (step S107). If there is a communication request, the sequential execution data processing module executed by the information processing device 100 sets information indicating that there was a communication request in the appropriate register for the relevant channel (communication channel register), and raises a flag that means there is input.

If a current channel is set in the above step S105 or step S107, the sequential execution data processing module executed by the information processing device 100 reads out and processes data from the set current channel 10 (step S108). Herein, if a flag that means there is input is raised, the sequential execution data processing module saves the current sequence register in the current communication channel register, sets the register of the relevant communication channel as the sequence register, and advances the process. The sequential execution data processing module then transmits a processing result via the relevant communication channel, and returns to the communication standby state in step S101.

Types of sequence registers included in a sequential execution data processing module will now be described. A sequence register may hold information such as an input/output port, a script code, a script's internal expression format, stack information, and a partial calculation result. The sequential execution data processing module is configured to hold this information for each channel, and according to a input queue or internal switch instruction, checks for a processing request from another channel, and switches to the other channel that transmitted the processing request.

The processing of an input script expression by the sequential execution data processing module will be described. Although script expressions are processed within the sequence of each communication channel, functions and variables defined by the execution of the expressions are set in a shared memory area. It is configured so that functions and variables set in the shared memory area may be used from a script expression on any communication channel.

In the present embodiment, the sequential execution data processing module offers a function that analyzes and reconfigures multiple different script languages. The sequential execution data processing module according to the present embodiment is first switched by a shared language switch script expression, and after switching, and also outputs results according to the language after the switch.

Additionally, if an access control attribute is added to a function or variable, there is included a structure that checks an authentication list for each channel sequence, and allows usage only if already authenticated. Since the authentication list is specific to each channel and structured so that the authentication list cannot be referenced from other channels, the security of each channel is maintained.

Figure 9:
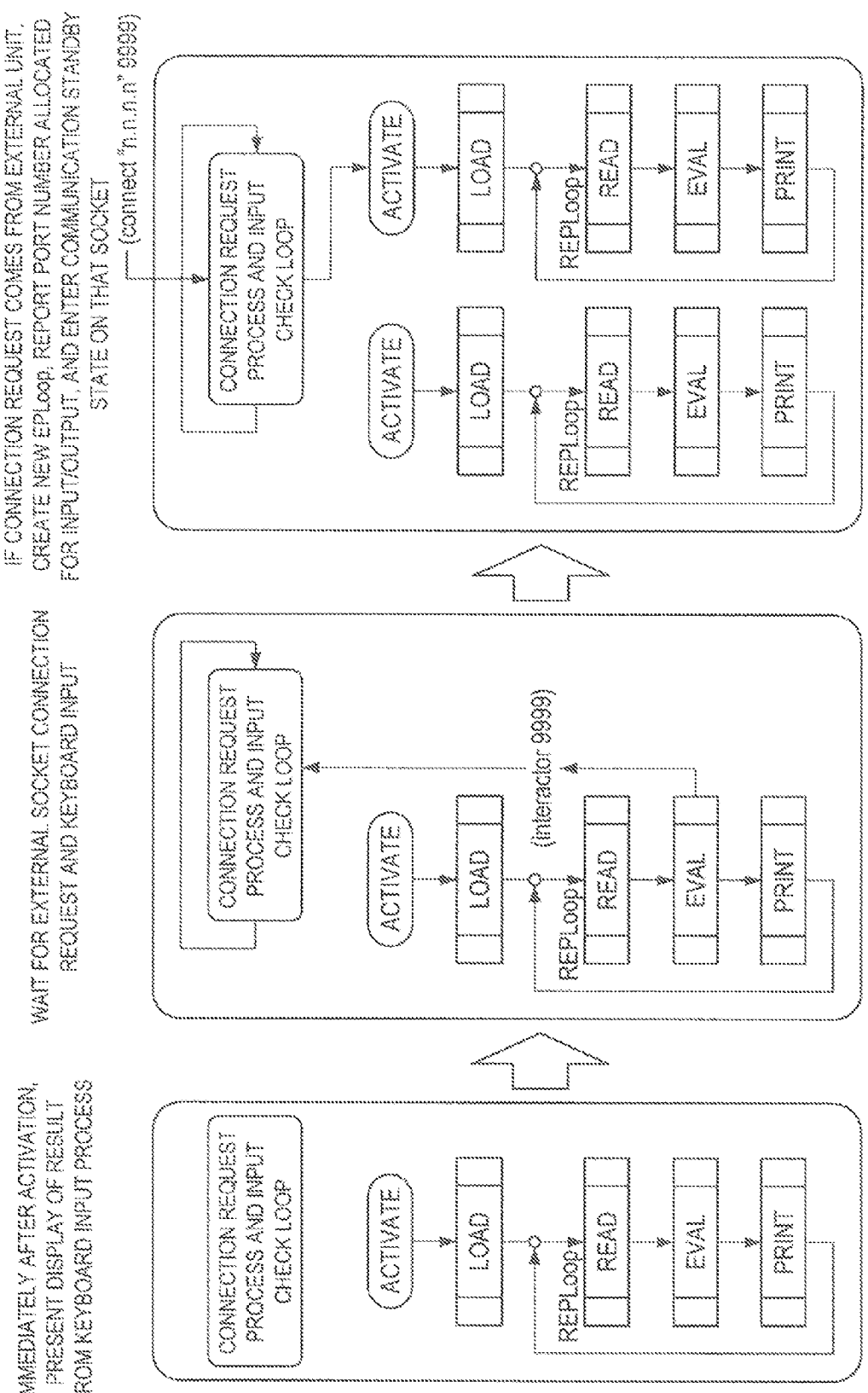
FIG. 9 is an explanatory diagram illustrating a process by a sequential execution data processing module for creating a communication channel according to a mutual linkage announcement and a connection request process from an external unit.

The creation of a communication channel by a sequential execution data processing module according to the present embodiment will be described in further detail. FIG. 9 is an explanatory diagram illustrating a process by a sequential execution data processing module for creating a communication channel according to a mutual linkage announcement and a connection request process from an external unit.

As illustrated on the left side of FIG. 9, immediately after the sequential execution data processing module is activated by the information processing device 100, the sequential execution data processing module executes a REPLoop that receives keyboard input and returns a result. Additionally, as illustrated in the center of FIG. 9, the sequential execution data processing module executes a command for receiving a socket connection request from another device, on the basis of keyboard input. In the present embodiment, a command for receiving a socket connection request from another device and mutually linking is designated "interactor". In this command for mutually linking, there is specified a port number on which to receive a socket connection request from another device. In the example illustrated in FIG. 9, the port number 9999 is configured as the port that receives a socket connection request from another device.

After the command for mutually linking is executed, the sequential execution data processing module executes a connection request process and an input check loop. This corresponds to the process from step S101 to step S106 in the flowchart illustrated in FIG. 8. Note that even after executing the command for mutually linking with another device, the sequential execution data processing module may still execute the REPLoop that receives keyboard input from the current device itself and returns a result.

In addition, if a socket connection request is transmitted from another device, then as illustrated on the right side of FIG. 9, the sequential execution data processing module creates a new REPLoop, reports the port number of the socket allocated as the input/output for the connection from the other device, and enters a communication standby state on that socket. In the present embodiment, the command for a socket connection request from another device is designated "connect", in which the IP address of the information processing device 100 and a port number are specified as arguments.

In this way, a sequential execution data processing module according to the present embodiment is able to create multiple REPLoops, and if respective modules are announcing mutual linkage, the modules are able to create a communication channel with each other. For this reason, variable and function definitions as well as operations on variables and functions by scripts between modules of equal standing become possible.

Figure 10:
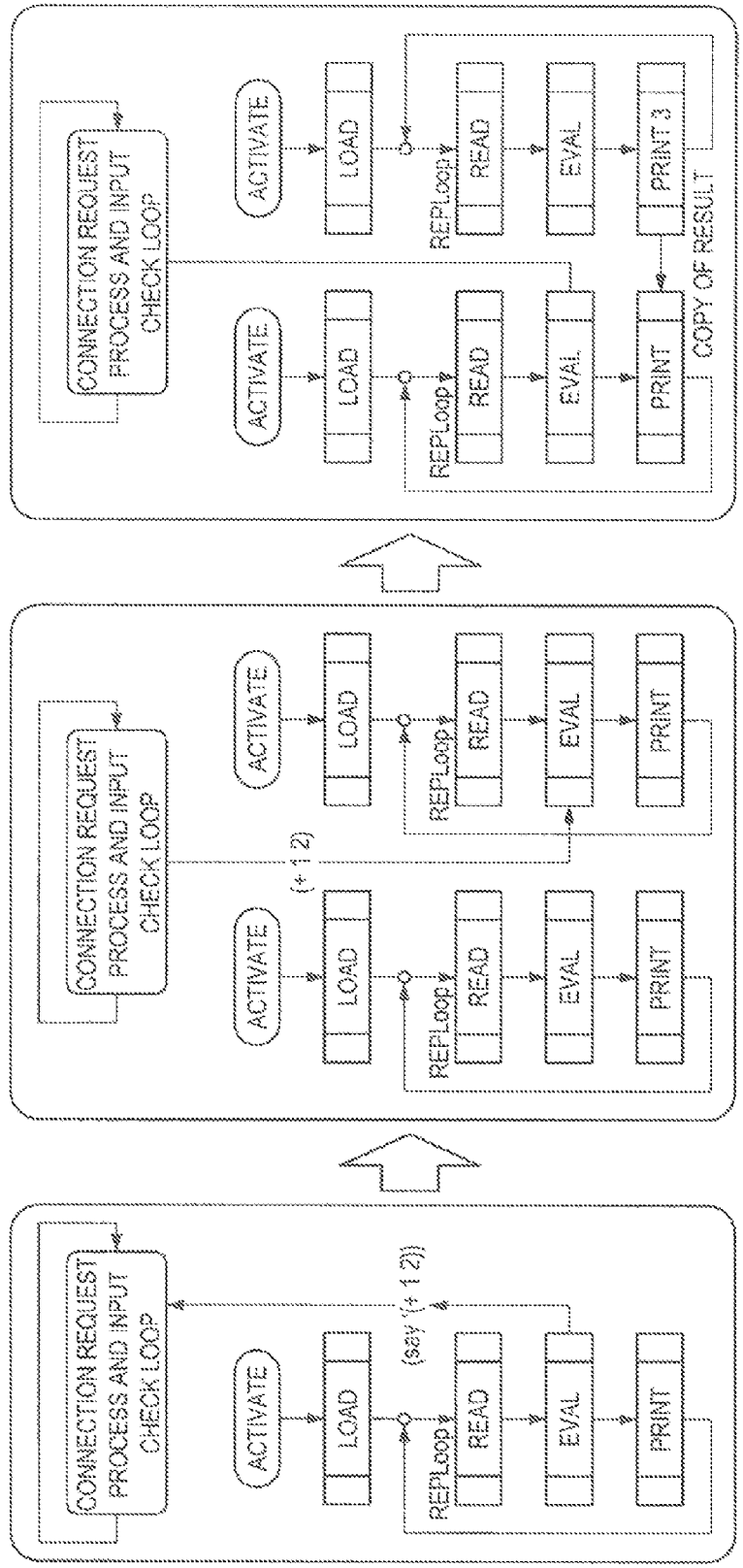
FIG. 10 is an explanatory diagram illustrating an exemplary modification of the internal state of a sequential execution data processing module using multiple REPLoops.

A sequential execution data processing module according to the present embodiment is able to create multiple REPLoops, and thus is able to create a new internal processing channel, and delegate processing to that channel. The sequential execution data processing module receives a script expression via a processing channel, and without waiting for a processing result of that script expression, replies to the source with a response that means the script expression was received. The process of the script is executed with a new sequence, and the result is held within the module. Subsequently, when a result request comes from the source of the script expression, the held processing result is returned. FIG. 10 is an explanatory diagram illustrating an exemplary modification of the internal state of a sequential execution data processing module using multiple REPLoops.

As illustrated on the left side of FIG. 10, immediately after the sequential execution data processing module is activated by the information processing device 100, the sequential execution data processing module executes a REPLoop that receives keyboard input and returns a result. At this point, if the input of a command for creating a new processing channel is received from the keyboard, the sequential execution data processing module interprets the command to be an internal channel creation request, and creates an internal input/output port and a new channel. Herein, the command for creating a new processing channel is designated "say". The example illustrated in FIG. 10 illustrates the case of causing a new processing channel to execute the addition process (1+2).

As illustrated in the center of FIG. 10, the connection request process and input check loop of the sequential execution data processing module depends on the evaluation of the expression given by the command "say" on the new processing channel. Also, the sequential execution data processing module reports the number of the created new processing channel to the channel that issued the command "say".

In addition, as illustrated on the right side of FIG. 10, if the channel that issued the command "say" specifies the reported channel number and issues a command for acquiring a processing result, a processing result may be acquired from the requested processing channel. Herein, the command for acquiring a processing result is designated "check", in which the channel number of the channel that requested the process is specified as an argument. In the example illustrated in FIG. 10, since the new processing channel is made to execute the addition process (1+2), if the command "check" for acquiring a processing result is executed, "3" is returned as a result.

Note that although the example illustrated in FIG. 10 indicates an example of newly creating a processing channel within the same device and causing the new processing channel to conduct a process, the present disclosure is not limited to such an example. If the request source and the request destination are separate devices, and a sequential execution data processing module according to the present embodiment is being executed by each of the devices, the request destination device may be made to conduct a process from the request source device.

Figure 11:
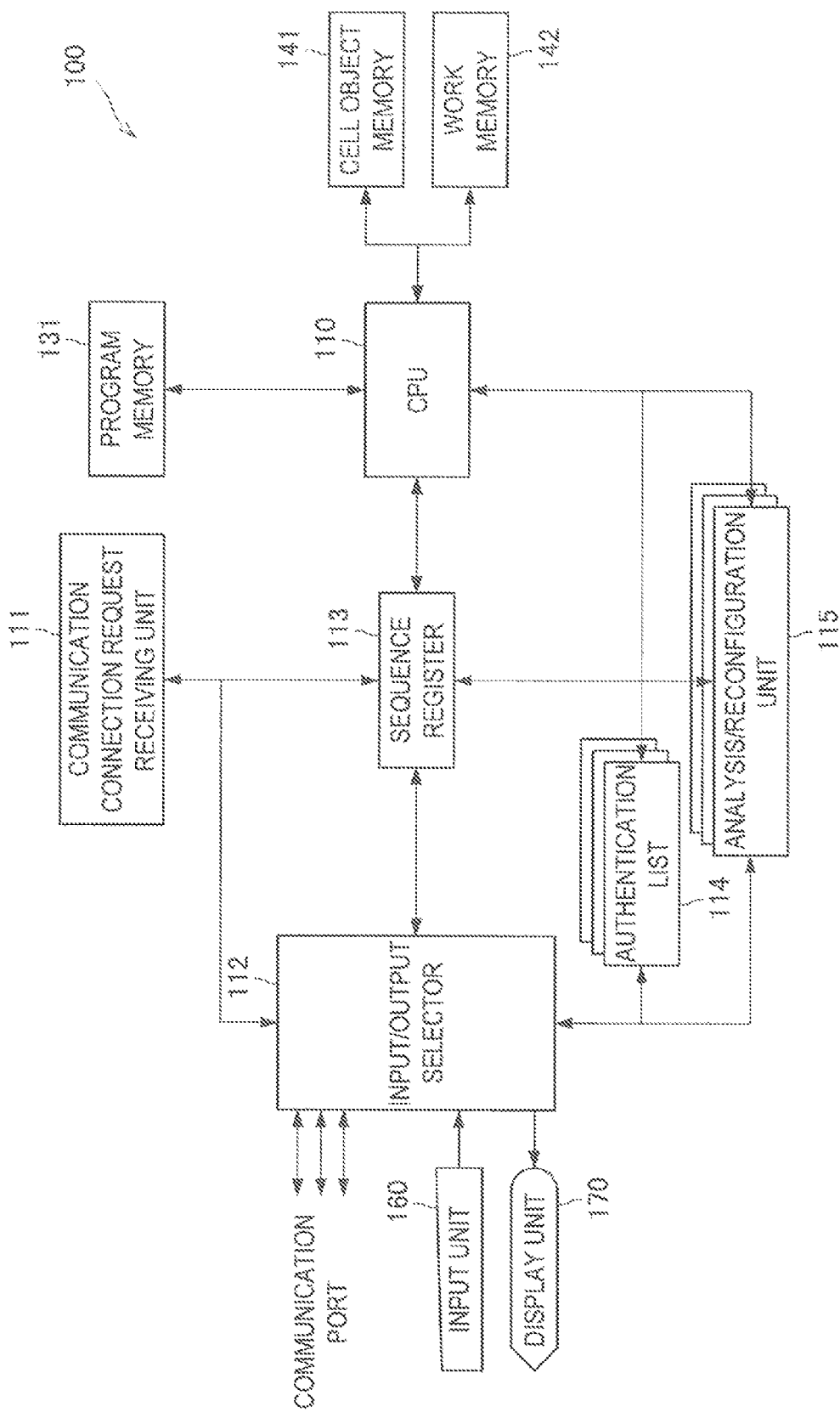
FIG. 11 is an explanatory diagram illustrating an exemplary structure of mutual linkage in a sequential execution data processing module.

FIG. 11 is an explanatory diagram illustrating an exemplary structure of mutual linkage in a sequential execution data processing module executed by an information processing device 100 according to the present embodiment. FIG. 11 illustrates program memory 131 that stores programs, cell object memory 141 that stores variables, and work memory 142 that temporarily stores data.

The communication connection request receiving unit 111 receives a communication connection request, and replies with a configured input/output channel number. The information processing device 100 includes a sequence register 113, and initially configures a script language in the analysis/reconfiguration unit 115, activates a program sequence linked to the channel number, and enters a receiving standby state. The analysis/reconfiguration unit 115 has multiple syntax analysis functions and statement reconfiguration functions that interpret and reconstruct multiple languages. Since it is possible to treat the internal expression of function and variable definitions as one optimal method, in which one channel loads in a given script language A while another channel loads and processes in a different script language B, the information processing device 100 becomes capable of communication with multiple differing script languages. Also, equipping information processing device 100 with the analysis/reconfiguration unit 115 enables translation operations, such as transmitting a script according to an instruction in script language A to another module in script language B. Also, the analysis/reconfiguration unit 115 interprets the context of a script to thereby convert between symbol names used in the current device and symbol names used externally. For example, in a case in which a given first command and a different second command are used as a set in a script language A, if the first command and the second command appear in a script when converting from the script language A to the script language B, the analysis/reconfiguration unit 115 interprets that context, and converts the script to suitable commands in the script language B.

If data is input on an opened input channel, the input/output selector 112 switches the input to a communication port. If data is input on an opened input channel, the sequence corresponding to that input channel is released from the standby state, and executes a process based on the input data. If a script language switch instruction is input on the opened input channel, the script language is switched to the language corresponding to the analysis/reconfiguration unit 115 of the relevant input/output channel, but the internal format holding functions and variables is not changed.

Additionally, access to functions and variables having a security attribute is managed on the basis of an authentication list 114 held per communication channel. The authentication list 114 stores successful authentications between authentication keys used when accessing functions and variables with respect to a sequential execution data processing module executed by another device. By keeping an authentication list 114 for every communication channel, the information processing device 100 becomes able to extend a secure session on each channel, and successively receive scripts while still maintaining a secure session.

A communication port opened according to an external request stops and waits for input after a single process finishes, but if a program sequence contains code that communicates with an external device, and that code is executed, a communication connection request is delivered to a target device through the open communication link, a communication channel number is acquired, and communication with the target device is established. If the other side communicating on this communication link has the same configuration as the information processing device 100, a script expression may be sent from the information processing device 100 to achieve a processing request.

A sequential execution data processing module according to the present embodiment includes "say", "check", and "break", which are built in as definitions of new script expressions. The expression "say" returns a reply without ending the message process following thereafter. The message process is continued on the communication channel that is subsequently opened internally, and that communication channel holds the message processing result. The expression "check" retrieves a processing result executed by "say". The expression "break" is used to forcibly terminate in the case in which a process executed by "say" does not end. Obviously, the names of expressions for realizing the processes discussed above are not limited to such an example.

Figure 12:
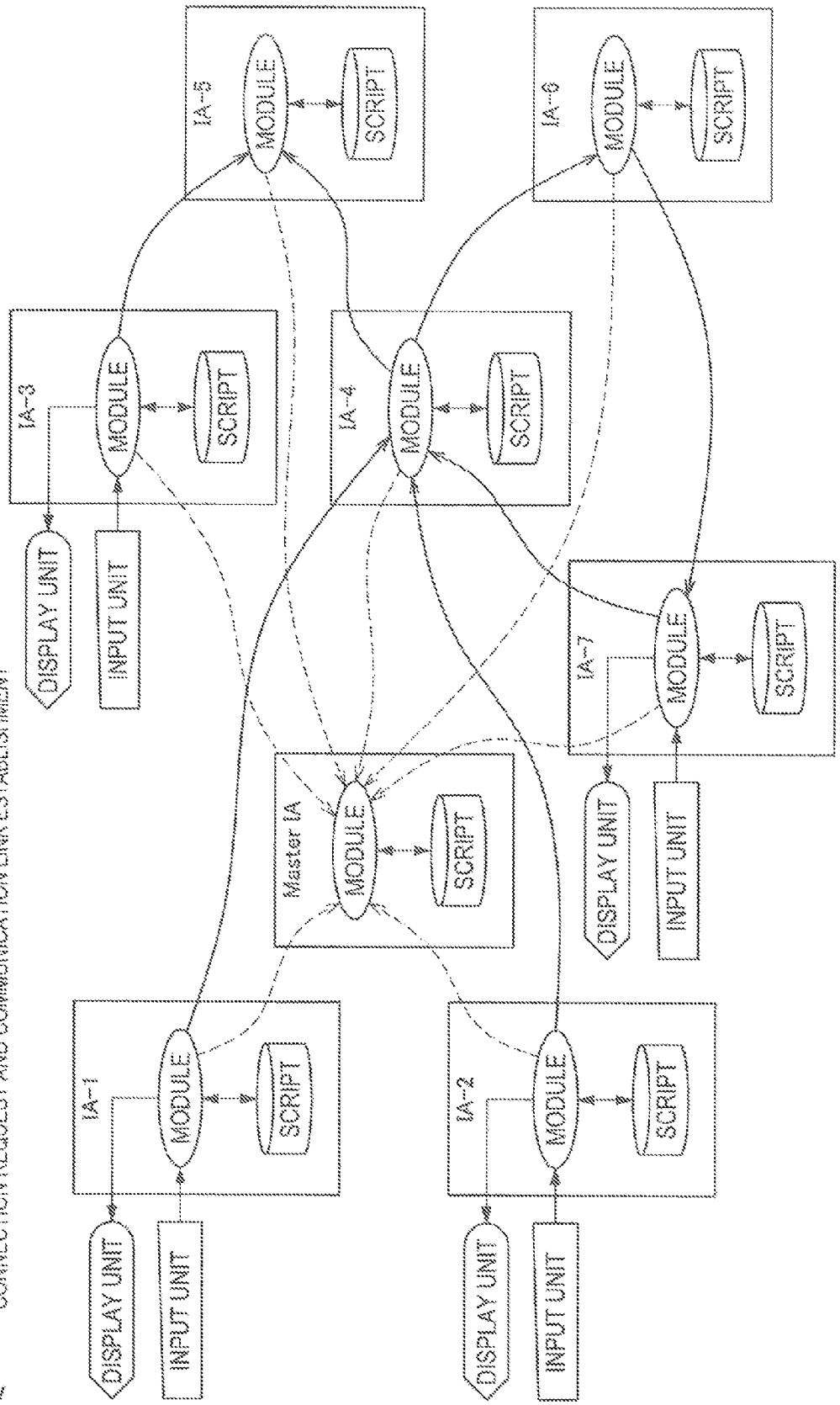
FIG. 12 is an explanatory diagram illustrating a conceptual overview of a distribution process by a sequential execution data processing module according to the present embodiment.

FIG. 12 is an explanatory diagram illustrating a conceptual overview of a distribution process by a sequential execution data processing module according to the present embodiment. The device "Master IA" illustrated in FIG. 12 is the device at the root of the system, for example, includes a built-in sequential execution data processing module according to the present embodiment, and starts a mutual linkage announcement on a predetermined communication address and port number.

The devices "IA-1" to "IA-7" are devices connected directly or indirectly to "Master IA", and include a built-in sequential execution data processing module according to the present embodiment. The devices "IA-1" to "IA-7", after activating the sequential execution data processing module, register their own communication address and port number with the "Master IA", and also check for the presence of other, already active devices. FIG. 12 illustrates a state in which "IA-1" to "IA-7" are conducting activation registration and checking for the presence of communication peers with the "Master IA".

Subsequently, "IA-1" to "IA-7" confirm the activation of the sequential execution data processing module in another active device, and if that device is a target peer, use an address obtained from "Master IA" to send a communication connection request and establish a communication link. FIG. 12 illustrates a state in which, for example, "IA-1" registers its own communication address and port number with "Master IA" while also confirming the activation of the sequential execution data processing module of "IA-4", and sends a communication connection request to "IA-4". The device "IA-4" receives the communication connection request from "IA-1", opens a port for communication from "IA-1", and stands by to receive a command sent from "IA-1".

At this point, FIG. 12 illustrates a state in which a display and keyboard are connected to "IA-1", whereas a display and keyboard are not connected to "IA-4". While in the state of established communication between "IA-1" and "IA-4", if a command is input from the keyboard connected to "IA-1", and made to be processed by the sequential execution data processing module of "IA-4", the result is displayed on the display connected to "IA-1". Consequently, in this conceptual illustration. "IA-4" acts like a server, while "IA-1" acts like a client.

Exemplary applications of a sequential execution data processing module according to the present embodiment will be described by giving several examples.

For example, for bidirectional communication between equipment connected by a sensor network, a sequential execution data processing module according to the present embodiment may be built into each of the respective equipment, so that when new equipment is connected, the respective equipment report the presence of the new equipment to each other, and also exchange procedures to communicate with that equipment to optimize the network.

As another example, if new equipment is connected to a home LAN, the functionality possessed by that equipment and the procedures to use that functionality may also be reported to other equipment, enabling seamless connections.

As another example, consider a system in which multiple servers are connected by a network, with the system operating by distributing the overall load. If a failure occurs on one server, the server's functions may be switched to another server or network connection routes may be changed according to a notification form that server, thus enabling usage in an architecture with a self-healing mechanism.

As another example, even if there is a request from a script module with a different language, features, or functions, the request may be converted by a language interpretation module (the analysis/reconfiguration unit 115) internally configured inside the information processing device 100, and a script directive understandable by another module may be sent, thus enabling usage as a script translator.

As another example, modules may be built into respective modules in key infrastructure devices or the like for which a high degree of reliability and operational continuity is demanded, so that from a master module that unifies the module, the load conditions of each module may be checked, and resource distribution or connection routing may be changed to achieve an optimal load, thus making it easy to achieve optimal operation even while running. Also, each module may be additionally configured with an operating log collection module, so that internal changes in each module may be monitored, and a malfunctioning module may be detected and reported to a master module to apply corrections or the like, even while running. Thus, load adjustment, failure detection, and malfunction corrections may be conducted without stopping the system.

In the example illustrated in FIG. 12, it may also be configured so that if communication is established between "IA-1" and "IA-4", and communication is established between "IA-4" and "IA-5", the sequential execution data processing module of "IA-1" causes the sequential execution data processing module of "IA-5" to perform a process via the sequential execution data processing module of "IA-4". If a command is sent from "IA-1" to "IA-4" but the sequential execution data processing module of "IA-4" is conducting some kind of intensive process, it becomes possible to transfer the command sent from "IA-1" from "IA-4" to "IA-5" for processing. Consequently, it becomes possible to use a sequential execution data processing module according to the present embodiment to construct a self-distributing system.

3. Conclusion

In the case of using a function or variable built into a sequential execution data processing module as a processing request from another communication channel, there exists a method that first closes the channel in advance, and then newly reconfigures the communication channel. However, with this method, if a processing request comes from another communication channel, it becomes necessary to close the open channel and re-open a channel, and the process becomes complicated. Moreover, with such a structure, it has not been possible to dynamically realize a request that responds to a processing request from a given communication channel, and while defining functions and variables or executing a function, changes the value of a variable used by that processing program, or changes some of the functions to be used, from another communication channel.

Also, with such a structure, it has not been possible to realize, without a specialized script program, a configuration enabling modules to construct a network with each other, such as one in which a main sequential execution data processing module answering different requests from multiple similar modules while also sending out a request to another similar module.

Meanwhile, a data processing module that receives a script expression via a communication channel other than keyboard input, and returns the processing result via the receiving communication channel has also been conceived. However, in the case of multiply connecting such data processing modules via a communication channel, all modules enter a standby state until the last module finishes the process and returns a response, and independent processing was not possible.

Additionally, sequential execution data processing modules of the related art are respectively defined in specialized script languages. Directly communicating by using another script language and script input communication channel was impossible, requiring intermediary specialized script translation software. Also, a sequential execution data processing module having a security function was required to re-authenticate a required object every time the channel is switched, being unable to respond to a new request from another module while maintaining one channel as a secure and encrypted communication session. Because of such restrictions, there were inconveniences, such as the inability to simultaneously establish a session for executing payment through another channel while maintaining a session that charges electronic money with an electronic money server or the like, for example.

In contrast, a sequential execution data processing module according to the present embodiment is configured to expand the functionality of a sequential execution data processing module of the related art, and be able to not only load and execute scripts from a keyboard or file via a single channel, but also open multiple network channels, and process successive requests while maintaining the channels.

An information processing device equipped with a sequential execution data processing module according to the present embodiment, by having such a configuration, becomes able to dynamically modify functions that process requests from a given channel and internally held variables, according to a processing request from another channel. By having such a configuration, it becomes possible to process work with different rights via separate channels, such as for the charge and payment of electronic money, writing and deleting log data, managing energy supply and consumption quantities in a smart grid meter, car rental time and elapsed time, or service ticket purchase and usage, for example.

Additionally, if a security function is built into a sequential execution data processing module according to the present embodiment, it becomes possible to extend a secure session on each channel, and successively receive scripts while still maintaining a secure session. For this reason, it becomes possible to securely process payment requests and charge requests with respect to the same variable holding electronic money from a large number of devices, such as an electronic money server.

Also, with the input of a script expression via a communication link, the processing request destination is kept waiting until a processing result of the input expression is computed and the result is transmitted via the requesting communication channel. However, since the message transmitting function of a sequential execution data processing module according to the present embodiment is switched to the next process after confirming that a message has been sent to the other side, it becomes possible to immediately switch to the next process. Additionally, it becomes possible to subsequently receive a new message from a peer via another communication channel, and equal message communication that is not in a command-response format becomes possible.

Also, a sequential execution data processing module according to the present embodiment has multiple statement analysis functions and statement reconfiguration functions that interpret and reconstruct multiple languages, it is possible to treat the internal expression of function and variable definitions as one optimal method, in which one channel loads in a given script language A while another channel loads and processes in a different script language B, enabling communication with multiple differing script languages. Also, translation operations, such as transmitting a script according to an instruction in script language A to another module in script language B, become possible.

Usage of a variable or function defined and set with security in a sequential execution data processing module according to the present embodiment always requires an authentication operation. At this point, since authentication operations from multiple channels are managed with an authentication list for each channel, variables and functions may be used safely, without an authenticated variable or function being incorrectly used on another channel.

Also, even if a processing request is able to use a variable or function of a sequential execution data processing module according to the present embodiment via one communication channel according to external authentication via an external communication channel, since the processing request is linked to the communication channel that issued the request, the variable or function is protected from a request via a communication channel with no rights, and may be safely used.

Obviously, exemplary applications of a sequential execution data processing module executed by an information processing device 100 according to an embodiment of the present disclosure are not limited to those indicated above. In addition, rather than just linkage between equipment, similar operation may be realized by installing respective sequential execution data processing modules in separate areas (such as separate directories or separate folders) inside the same equipment. It is also possible to realize a storage medium storing a sequential execution data processing module executed by an information processing device 100 according to an embodiment of the present disclosure.

The foregoing thus describes preferred embodiments of the present disclosure in detail and with reference to the attached drawings. However, the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)

An information processing device including:

a program execution unit that loads, interprets, and executes a computer program code created by a first procedural language, wherein the program execution unit opens a communication channel in response to a communication connection request from an external unit, and returns to each communication channel a result for a processing request sent from an external unit on the opened communication channel.

(2)

The information processing device according to (1), wherein the program execution unit treats a sharable variable and function as modifiable by a processing request sent from an external unit on each communication channel, and also causes a result of modifying the variable and the function to also be reflected in a processing request by another communication channel that uses the same variable and function.

(3)

The information processing device according to (1) or (2), wherein the program execution unit loads, interprets, and executes a computer program code created by a second procedural language different from the first procedural language.

(4)

The information processing device according to (3), wherein the program execution unit interprets a code input on the opened communication channel, and reconfigures and transmits the code in the second procedural language.

(5)

The information processing device according to any one of (1) to (4), wherein the program execution unit receives a code via the opened communication channel, and without waiting for a processing result, returns a reply from the communication channel meaning that the code was received.

(6)

The information processing device according to (5), wherein the program execution unit generates a new sequence to process the received code and holds a processing result of the code, and returns the processing result when a result request comes from the communication channel that received the code.

(7)

The information processing device according to any one of (1) to (6), wherein the program execution unit restricts reference to a variable and execution of a function used by the code until after authentication, and authenticates by referring to an authentication list provided for each communication channel opened in response to a communication connection request from an external unit.

(8)

The information processing device according to any one of (1) to (7), wherein the program execution unit includes a communication unit that communicates with another program execution unit, and the program execution unit issues a connection request from the communication unit to the other program execution unit to cause a communication channel to be opened, and stores a successful authentication between an authentication key that authenticates a variable and execution of a function of the code, and an authentication key that authenticates a variable and execution of a function of the code held by the other program execution unit.

(9)

The information processing device according to any one of (1) to (8), wherein the program execution unit, by linking to the communication channel opened in response to the communication connection request from an external unit and interpreting code context, conducts a conversion between a symbol name used in the information processing device itself and a symbol name used in an external unit.

(10)

An information processing method including:

loading, interpreting, and executing a computer program code created by a first procedural language, wherein the executing opens a communication channel in response to a communication connection request from an external unit, and returns to each communication channel a result for a processing request sent from an external unit on the opened communication channel.

(11)

A computer program that causes a computer to:

load, interpret, and execute a computer program code created by a first procedural language, wherein the executing opens a communication channel in response to a communication connection request from an external unit, and returns to each communication channel a result for a processing request sent from an external unit on the opened communication channel.

(12)

A storage medium storing a computer program that causes a computer to:

load, interpret, and execute a computer program code created by a first procedural language, wherein the executing opens a communication channel in response to a communication connection request from an external unit, and returns to each communication channel a result for a processing request sent from an external unit on the opened communication channel.

REFERENCE SIGNS LIST 100, 200 information processing device
110 CPU
120 encryption/decryption unit
130 ROM
140 RAM
150 NVRAM
160 input unit
170 display unit

The invention claimed is:

1. An information processing device comprising:
a program execution unit that loads, interprets, and executes a first computer program code created by a first procedural language,
wherein the program execution unit
opens a communication channel in response to a communication connection request from each external unit of a plurality of external units that are remote to the information processing device,
creates or modifies at least one of a sharable variable and a sharable function in response to a processing request on a particular opened communication channel from a particular external unit of the plurality of external units,
returns to each communication channel of the plurality of communication channels sharing the at least one of the sharable variable and the sharable function a result for the processing request sent from the particular external unit on the particular opened communication channel, and
processes at least one successive processing request sent from at least one other external unit of the plurality of external units on one or more communication channels other than the particular opened communication channel according to the returned result of the processing request sent from the particular external unit,
wherein the program execution unit loads, interprets, and executes a second computer program code created by a second procedural language different from the first procedural language,
wherein the program execution unit restricts reference to the sharable variable and the sharable function used by the first computer program code until after authentication, and authenticates by referring to an authentication list provided for each communication channel in response to the communication request from each external unit of the plurality of external units, and
wherein the program execution unit is implemented via at least one processor.

2. The information processing device according to claim 1, wherein
the program execution unit interprets a code input on the particular opened communication channel, and reconfigures and transmits the second computer program code in the second procedural language.

3. The information processing device according to claim 1, wherein
the program execution unit receives a code via the particular opened communication channel, and without waiting for the result for the processing request, returns a reply to the particular opened communication channel meaning that the code was received.

4. The information processing device according to claim 3, wherein
the program execution unit generates a new sequence to process the received code and holds a processing result of the code, and returns the processing result of the code to each communication channel when a result request comes from the particular opened communication channel.

5. The information processing device according to claim 1, wherein
the program execution unit includes a communication unit that communicates with another program execution unit, and the program execution unit issues a connection request from the communication unit to the other program execution unit to cause a communication channel to be opened, and stores a successful authentication between an authentication key that authenticates a variable and execution of a function of the code, and an authentication key that authenticates a variable and execution of a function of the code held by the other program execution unit.

6. The information processing device according to claim 1, wherein
the program execution unit, by linking to the particular opened communication channel and interpreting code context, conducts a conversion between a symbol name used in the information processing device itself and a symbol name used in the particular external unit.

7. The information processing device according to claim 1, wherein
the program execution unit processes the at least one successive processing request sent from the at least one other external unit of the plurality of external units on the one or more communication channels other than the particular opened communication channel while maintaining the particular opened communication channel.

8. An information processing method executed via at least one processor, the method comprising:
loading, interpreting, and executing a first computer program code created by a first procedural language,
wherein the executing
opens a communication channel in response to a communication connection request from each external unit of a plurality of external units that are remotely located,
creates or modifies at least one of a sharable variable and a sharable function in response to a processing request on a particular opened communication channel from a particular external unit of the plurality of external units,
returns to each communication channel of the plurality of communication channels sharing the at least one of the sharable variable and the sharable function a result for the processing request sent from the particular external unit on the particular opened communication channel, and
processes at least one successive processing request sent from at least one other external unit of the plurality of external units on one or more communication channels other than the particular opened communication channel, according to the returned result of the processing request sent from the particular external unit,
wherein the method further comprises loading, interpreting, and executing a second computer program code created by a second procedural language different from the first procedural language, and
wherein reference to the sharable variable and the sharable function used by the first computer program code is restricted until after authentication, and the method further comprises authenticating by referring to an authentication list provided for each communication channel in response to the communication request from each external unit of the plurality of external units.

9. The information processing method according to claim 8, wherein
the executing processes the at least one successive processing request sent from the at least one other external unit of the plurality of external units on the one or more communication channels other than the particular opened communication channel while maintaining the particular opened communication channel.

10. A non-transitory computer-readable medium having embodied thereon a program, which when executed by a computer causes the computer to execute a method, the method comprising:

loading, interpreting, and executing a first computer program code created by a first procedural language, wherein the executing opens a communication channel in response to a communication connection request from each external unit of a plurality of external units that are remote to the computer, creates or modifies at least one of a sharable variable and a sharable function in response to a processing request on a particular opened communication channel from a particular external unit of the plurality of external units, returns to each communication channel of the plurality of communication channels sharing the at least one of the sharable variable and the sharable function a result for the processing request sent from the particular external unit on the particular opened communication channel, and processes at least one successive processing request sent from at least one other external unit of the plurality of external units on one or more communication channels other than the particular opened communication channel according to the returned result of the processing request sent from the particular external unit, wherein the method further comprises loading, interpreting, and executing a second computer program code created by a second procedural language different from the first procedural language, and wherein reference to the sharable variable and the sharable function used by the first computer program code is restricted until after authentication, and the method further comprises authenticating by referring to an authentication list provided for each communication channel in response to the communication request from each external unit of the plurality of external units.

11. The information processing device according to claim 10, wherein the program execution unit processes the at least one successive processing request sent from the at least one other external unit of the plurality of external units on the one or more communication channels other than the particular opened communication channel while maintaining the particular opened communication channel.

* * * * *